United States Patent
Kuranoshita et al.

(10) Patent No.: US 9,430,174 B2
(45) Date of Patent: Aug. 30, 2016

(54) PRINT PRODUCTION SYSTEM, PRINT PRODUCTION METHOD, NON-TRANSITORY STORAGE MEDIUM STORING PRINT PRODUCTION PROGRAM, AND PRINTING MANAGEMENT SERVER

(71) Applicant: FUJIFILM Corporation, Toyko (JP)

(72) Inventors: Masashi Kuranoshita, Tokyo (JP); Eiji Teraue, Tokyo (JP); Hiromichi Watanabe, Tokyo (JP); Koichiro Togawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/669,142

(22) Filed: Mar. 26, 2015

(65) Prior Publication Data
US 2015/0277831 A1 Oct. 1, 2015

(30) Foreign Application Priority Data

Mar. 31, 2014 (JP) ................................ 2014-070808
Sep. 29, 2014 (JP) ................................ 2014-199244

(51) Int. Cl.
*G06F 15/00* (2006.01)
*G06F 3/12* (2006.01)

(52) U.S. Cl.
CPC ............ *G06F 3/1268* (2013.01); *G06F 3/1204* (2013.01); *G06F 3/1275* (2013.01); *G06F 3/1285* (2013.01); *G06F 3/1288* (2013.01)

(58) Field of Classification Search
CPC ............................. G06F 3/1285; G06F 3/1268
USPC ............................................... 358/1.13–1.18
See application file for complete search history.

(56) References Cited

U.S. PATENT DOCUMENTS

2002/0111928 A1* 8/2002 Haddad ............... G06Q 10/087
2004/0064786 A1   4/2004 Ikeda et al.

FOREIGN PATENT DOCUMENTS

JP          4289934 B2      7/2009

* cited by examiner

*Primary Examiner* — Saeid Ebrahimi Dehkordy
(74) *Attorney, Agent, or Firm* — Sughrue Mion, PLLC

(57) ABSTRACT

A print production system includes an order-receiving server and a printing management server. The order-receiving server transmits an electronic operation manual including ordering information to the printing management server. The printing management server classifies a plurality of items for identifying content of a print job to be carried out into specifiable items that can be specified uniquely according to the electronic operation manual, and unspecifiable items that cannot be specified uniquely according to the electronic operation manual. The printing management server also generates job information by determining content of one or more unspecifiable items according to guidelines, and stores the job information in association with a management identifier of the print job.

17 Claims, 16 Drawing Sheets

| ATTRIBUTES | INSTRUCTED CONTENTS |
|---|---|
| ORDER NUMBER | 12345 |
| PRODUCT NAME | MONTHLY CMYK, MARCH ISSUE |
| DELIVERY DATE | 21:00, 31 MARCH 2014 |
| CUSTOMER INFORMATION | ABC COMPANY |
| ... | ... |
| NUMBER OF PAGES | 32 |
| FINISHED SIZE | 297mm × 210mm |
| BINDING METHOD | ADHESIVE BINDING |
| MEDIUM SIZE | 880mm × 625mm |
| ... | ... |
| PRINTING PRESS NAME | APPARATUS P |
| PROOFER NAME | APPARATUS Q |
| ... | ... |

FIG. 6A

| ITEMS | DETERMINED GUIDELINES |
|---|---|
| JOB MANAGEMENT NUMBER | SAME AS "ORDERING NUMBER" |
| JOB NAME | SAME AS "PRODUCT NAME" |
| DELIVERY DATE | SAME AS "DELIVERY DATE", SECONDS, MINUTES, HOURS, DAY, MONTH, YEAR |
| CUSTOMER INFORMATION | "COMPANY NAME" + "NAME OF PERSON IN CHARGE" REGISTERED IN CUSTOMER INFORMATION DB |

FIG. 6B

| ITEMS | CONTENTS |
|---|---|
| JOB MANAGEMENT NUMBER | 12345 |
| JOB NAME | MONTHLY CMYK, MARCH ISSUE |
| DELIVERY DATE | 21:00:00, 31 MARCH 2014 |
| CUSTOMER INFORMATION | ABC COMPANY XYZ |

FIG. 7A

| ITEMS | DETERMINED GUIDELINES |
|---|---|
| IMPOSITION PATTERN | (1) CALCULATE MAXIMUM NUMBER OF PAGES THAT CAN BE PLACED FROM "MEDIUM SIZE" AND "FINISHED SIZE".<br>(2) SELECT ONE OPTIMUM PATTERN MATCHING CONDITIONS OF "BINDING METHOD" AND "MAXIMUM NUMBER OF PAGES" FROM REGISTERED TEMPLATE<br>(3) APPLY PRESENT ALGORITHM SUCCESSIVELY TO ALL PAGE NUMBERS |

FIG. 7B

| ITEMS | DETERMINED GUIDELINES |
|---|---|
| WORKFLOW CONFIGURATION | ACCORDING TO MAPPING TABLE |

| PRINT OUTPUT | PROOF | WORKFLOW CONFIGURATION |
|---|---|---|
| CONVENTIONAL PRINTING PRESS | PRESENT PRESS | PS → P |
| | INK JET PRINTING PRESS | PF → H → PS → P |
| DIGITAL PRINTING PRESS | DIGITAL PRINTING PRESS | P |

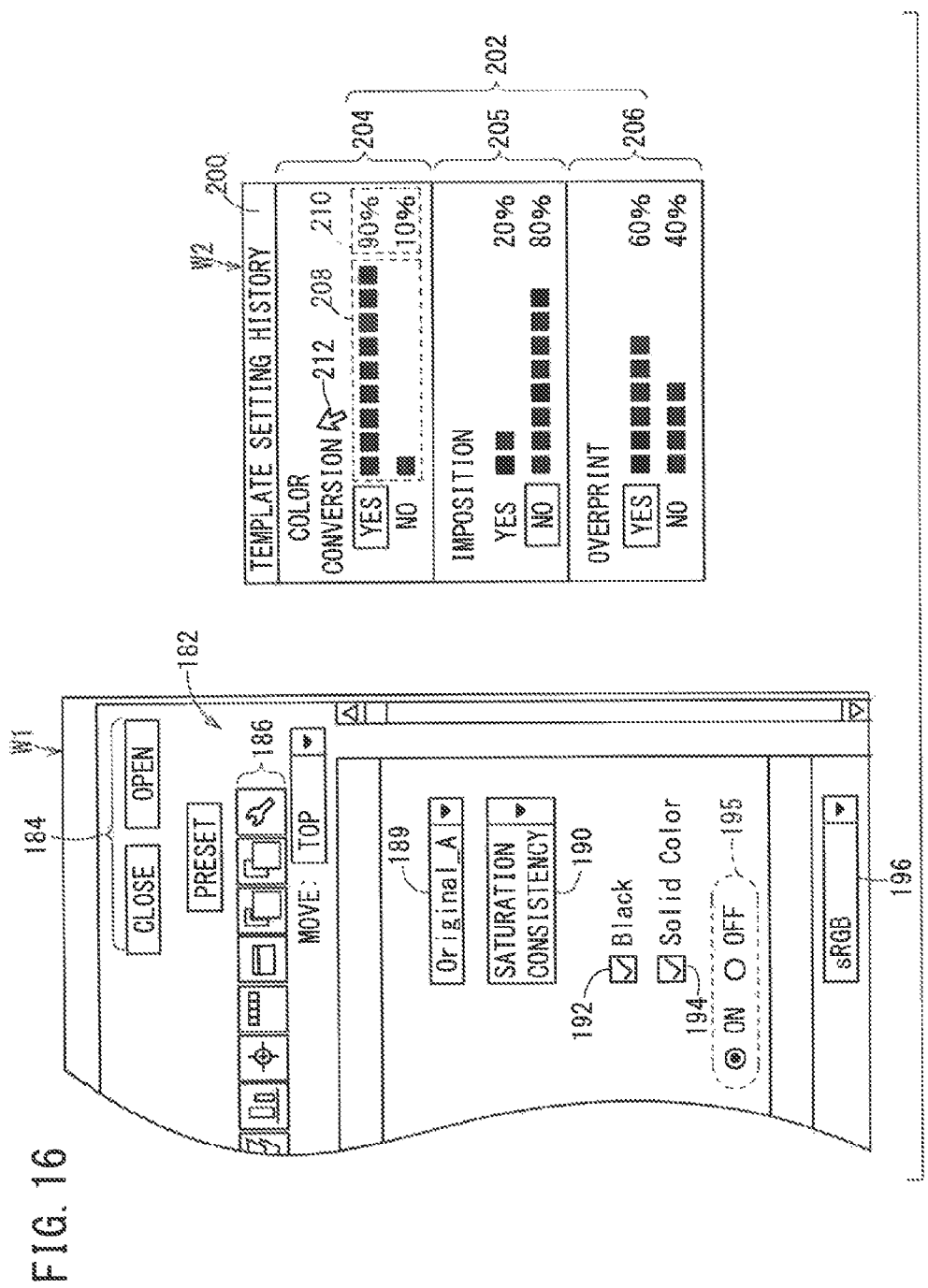

PRINT PRODUCTION SYSTEM, PRINT PRODUCTION METHOD, NON-TRANSITORY STORAGE MEDIUM STORING PRINT PRODUCTION PROGRAM, AND PRINTING MANAGEMENT SERVER

CROSS-REFERENCE TO RELATED APPLICATION

This application is based upon and claims the benefit of priority from Japanese Patent Applications No. 2014-070808 filed on Mar. 31, 2014 and No. 2014-199244 filed on Sep. 29, 2014, the contents all of which are incorporated herein by reference.

BACKGROUND OF THE INVENTION

1. Field of the Invention

The present invention relates to a print production system having an order-receiving server for managing ordering information of a print and a print management server for managing a print job concerning the production of the print, and a print production method to be carried out using the print production system. The present invention further relates to a non-transitory storage medium in which a print production program to be executed by the print production system is stored. In addition, the present invention relates to a printing management server for managing the print job.

2. Description of the Related Art

Recently, in the field of printing, printing processes have been digitized in their entirety, thanks to the widespread use of desktop publishing (DTP) and computer-to-plate (CTP) technologies. In order to increase the efficiency with which prints are produced, various automating technologies have been proposed with respect to the determination of printing parameters.

Japanese Patent No. 4289934 proposes an apparatus for and a method of automatically generating a workflow for printing and platemaking processes, using various information including environmental information, output requirements, and generating rules.

SUMMARY OF THE INVENTION

Usually, a person in charge who works in a production department (downstream process) of a printing company acquires an operation manual from the sales and planning department (upstream process), determines the content of a print job to be carried out from a description provided in the operation manual, and enters data using a terminal apparatus in order to generate a job ticket (JDF file or the like). Since many types of items exist for identifying the content of a print job to be carried out, the person in charge requires a considerable number of man-hours to be spent until the entry of the data is completed, even if the person in charge is skilled.

According to Japanese Patent No. 4289934, nothing is disclosed specifically concerning a process of finding the location of each of respective items of data and acquiring each of such data items. Further, other matters, for example, the organizational structure of the printing company, are not taken into consideration.

An object of the present invention is to provide a print production system, a print production method, a non-transitory storage medium in which a print production program is stored, and a printing management server, which are capable of significantly reducing the number of man-hours required to be spent after a print order has been received and until job information for the print order is generated.

According to the present invention, a print production system is provided, comprising an order-receiving server for managing ordering information for a print, and a printing management server for managing a print job for producing the print. The order-receiving server includes a transmission processor for transmitting an electronic operation manual including the ordering information to the printing management server. The printing management server includes an item classifier for classifying a plurality of items for identifying content of the print job to be carried out into specifiable items that can be specified uniquely according to the electronic operation manual transmitted from the transmission processor, and unspecifiable items that cannot be specified uniquely according to the electronic operation manual, a job information generator for generating job information descriptive of the print job by determining content of one or more unspecifiable items classified by the item classifier according to guidelines, and a job information database for storing the job information that is generated by the job information generator in association with a management identifier of the print job.

As described above, a plurality of items for identifying the content of the print job to be carried out are classified into specifiable items that can be specified uniquely according to the electronic operation manual transmitted from the transmission processor, and unspecifiable items that cannot be specified uniquely according to the electronic operation manual. Job information is generated by determining the content of one or more unspecifiable items according to guidelines. The print production system, which is configured in the foregoing manner, is capable of automatically generating job information in which a portion of the content of the electronic operation manual is supplemented appropriately. Consequently, the print production system is effective in significantly reducing the number of man-hours required after the print has been ordered and until the job information is generated.

Preferably, in the print production system, the printing management server further includes an identifier generator for generating a common identifier, which is identical to or different from the management identifier, in the event that the information is newly generated by the job information generator, the job information database stores at least one of the job information and the management identifier in association with the common identifier that is generated by the identifier generator, and the order-receiving server includes an ordering information database for storing the ordering information in association with the common identifier.

Preferably, in the print production system, the transmission processor transmits the electronic operation manual to the printing management server, the electronic operation manual including modifying information for the ordering information and the common identifier, which are stored in the ordering information database, the job information generator newly generates the job information in which the modifying information is reflected, on the basis of the electronic operation manual transmitted from the transmission processor, and the job information database updates the job information depending on the common identifier.

Preferably, in the print production system, the printing management server further includes a reference database for storing template information or additional information concerning the unspecifiable items, and the job information generator generates the job information by determining content of the unspecifiable items, on the basis of results of a search of the reference database, which is carried out under search conditions represented by a portion of the information included in the electronic operation manual.

Preferably, in the print production system, the printing management server further includes a guideline updater for updating the guidelines, and the job information generator generates the job information according to the guidelines that are updated by the guideline updater.

Preferably, in the print production system, the guideline updater updates the guidelines by extracting new guidelines that differ from original guidelines on the basis of differential information between original job information generated according to the original guidelines and new job information produced by changing the content of the original job information.

Preferably, in the print production system, the guideline updater updates the guidelines if the guideline updater receives an action taken by the user of the print production system.

Preferably, the print production system further comprises a protocol converter for converting a data format of the electronic operation manual transmitted to the protocol converter, according to a data protocol for normalizing data formats of a plurality of types of electronic operation manuals.

Preferably, the print production system further comprises a terminal apparatus for communicating with the printing management server, wherein the terminal apparatus includes a user interface for referring to the job information database, calling up a data template representing a set of initial values of parameters concerning printing, displaying the set of initial values, and changing values of the parameters, and a result image generator for generating a result image showing results of a statistical process performed on a plurality of differential data between a set of finalized values of the parameters, which are set a plurality of times in the past through the user interface, and the set of initial values of the data template, and the result image that is generated by the result image generator is displayed simultaneously with the set of initial values, which are displayed by newly calling up the data template through the user interface.

According to the present invention, there also is provided a print production method using a system including an order-receiving server for managing ordering information for a print, and a printing management server for managing a print job for producing the print, wherein the order-receiving server carries out a transmitting step of transmitting an electronic operation manual including the ordering information to the printing management server, and the printing management server carries out a classifying step of classifying a plurality of items for identifying content of the print job to be carried out into specifiable items that can be specified uniquely according to the transmitted electronic operation manual, and unspecifiable items that cannot be specified uniquely according to the electronic operation manual, a generating step of generating job information descriptive of the print job by determining content of one or more unspecifiable items classified according to guidelines, and a storing step of storing the generated job information in association with a management identifier of the print job.

According to the present invention, there further is provided a non-transitory storage medium in which a print production program is stored to be executed by a system including an order-receiving server for managing ordering information for a print, and a printing management server for managing a print job for producing the print, wherein the print production program enables the order-receiving server to carry out a transmitting step of transmitting an electronic operation manual including the ordering information to the printing management server, and the print production program enables the printing management server to carry out a classifying step of classifying a plurality of items for identifying content of the print job to be carried out into specifiable items that can be specified uniquely according to the transmitted electronic operation manual, and unspecifiable items that cannot be specified uniquely according to the electronic operation manual, a generating step of generating job information descriptive of the print job by determining content of one or more unspecifiable items classified according to guidelines, and a storing step of storing the generated job information in association with a management identifier of the print job.

According to the present invention, there is further provided a printing management server for managing a print job for producing a print, comprising an item classifier for classifying a plurality of items for identifying content of the print job to be carried out into specifiable items that can be specified uniquely according to the transmitted electronic operation manual, and unspecifiable items that cannot be specified uniquely according to the electronic operation manual, a job information generator for generating job information descriptive of the print job by determining content of one or more unspecifiable items classified by the item classifier according to guidelines, and a job information database for storing the job information that is generated by the job information generator in association with a management identifier of the print job.

Preferably, the printing management server further comprises an identifier generator for generating a common identifier, which is identical to or different from the management identifier, in the event that the information is newly generated by the job information generator, wherein the job information database stores at least one of the job information and the management identifier in association with the common identifier that is generated by the identifier generator.

Preferably, the printing management server further comprises a reference database for storing template information or additional information concerning the unspecifiable items, wherein the job information generator generates the job information by determining content of the unspecifiable items, on the basis of results of a search of the reference database, which is carried out under search conditions represented by a portion of the information included in the electronic operation manual.

Preferably, the printing management server further comprises a guideline updater for updating the guidelines, and the job information generator generates the job information according to the guidelines that are updated by the guideline updater.

Preferably, in the printing management server, the guideline updater updates the guidelines by extracting new guidelines that differ from original guidelines on the basis of differential information between original job information generated according to the original guidelines and new job information produced by the changing content of the original job information.

Preferably, in the printing management server, the guideline updater updates the guidelines if the guideline updater receives an action taken by the user of the printing management server.

Preferably, the printing management server further comprises a protocol converter for converting a data format of the electronic operation manual transmitted to the protocol converter, according to a data protocol for normalizing data formats of a plurality of types of electronic operation manuals.

According to the present invention, as described above, a plurality of items for identifying content of the print job to be carried out are classified into specifiable items that can be specified uniquely according to the transmitted electronic operation manual, and unspecifiable items that cannot be specified uniquely according to the electronic operation manual. Job information is generated by determining content of one or more unspecifiable items according to guidelines. Consequently, job information can automatically be generated in which a portion of the content of the electronic operation manual is supplemented appropriately. Further, the number of man-hours required after the print has been ordered and until the job information is generated can significantly be reduced.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 5 is a diagram showing an example of data that makes up an electronic operation manual shown in FIGS. 2 and 3;

FIG. 6A is a first diagram with respect to guidelines for determining the content of individual items;

FIG. 6B is a diagram showing results obtained when the content of the individual items shown in FIG. 6A are determined;

FIG. 7A is a second diagram with respect to guidelines for determining the content of individual items;

FIG. 7B is a third diagram with respect to guidelines for determining the content of individual items;

FIG. 16 is an image diagram showing an example of a displayed screen.

DESCRIPTION OF THE PREFERRED EMBODIMENTS

A print production method according to a preferred embodiment, in relation to a print production system for carrying out the print production method, a non-transitory storage medium in which a print production program is stored, and a printing management server, will be described in detail below with reference to the accompanying drawings.

[Overall Configuration of Print Production System 10]

Figure 1:
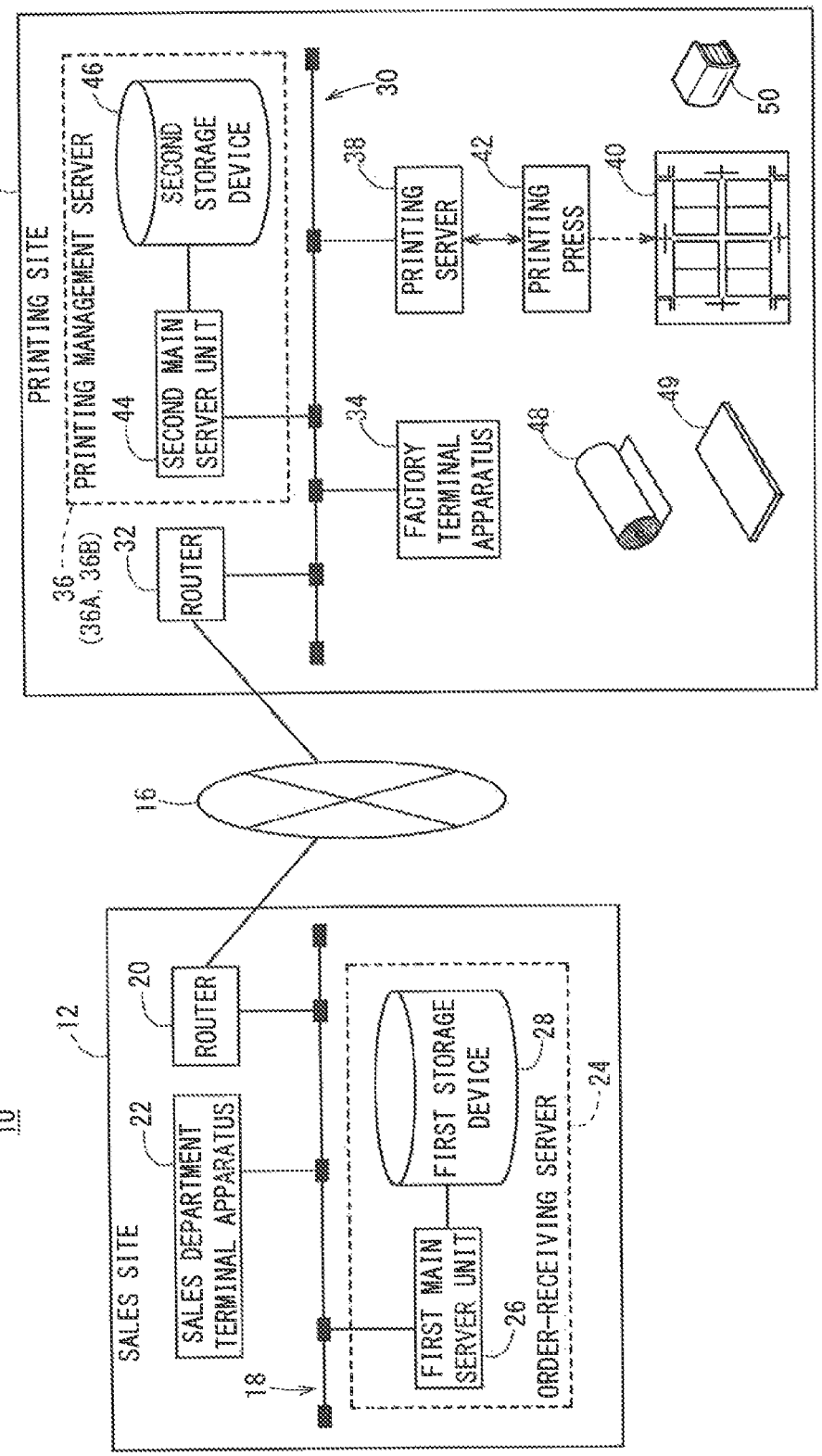
FIG. 1 is a block diagram showing an overall configuration of a print production system according to an embodiment of the present invention.

FIG. 1 shows in block form the overall configuration of a print production system 10 according to an embodiment of the present invention.

As shown in FIG. 1, the print production system 10 is a system including a sales site 12, which is administered by the sales department of a printing company, and a printing site 14, which is administered by the production department of the printing company. The sales site 12 and the printing side 14 are interconnected through a network 16 such as a local area network (LAN) or a wide area network (WAN).

The sales site 12 includes a router 20 serving as a device that provides a connection between the network 16 and a LAN 18 established in the sales site 12, a sales department terminal apparatus 22 that is operated by a salesperson, and an order-receiving server 24 for managing ordering information concerning a product, which typically is a print 50 according to the present embodiment. The sales department terminal apparatus 22 and the order-receiving server 24 are connected for communication with each other via the LAN 18.

The order-receiving server 24 is a management information system (MIS) server for sequentially managing ordering information and management information concerning the printing company. As shown in FIG. 1, the order-receiving server 24 includes a first main server unit 26, and a first storage device 28 that is connected to the first main server unit 26.

The first storage device 28 stores various pieces of management information, including received orders, sales, sales activities, estimates, annual production plans, monthly production plans, weekly and daily production plans, warehousing and shipping, inventories, stock purchasing, and costs, etc., for example.

The printing site 14 includes a router 32 serving as a device that provides a connection between the network 16 and a LAN 30 established in the printing site 14, a factory terminal apparatus 34 operated by production personnel, a printing management server 36 for managing print jobs, a printing server 38 for performing raster image processing (RIP) on imposed platemaking data, and a printing press 42 for producing a printed sheet 40 on the basis of printing data supplied from the printing server 38. The factory terminal apparatus 34, the printing management server 36, and the printing server 38 are connected for communication with each other via the LAN 30.

The printing management server 36 is a core device for work flow management in the print production system 10. As shown in FIG. 1, the printing management server 36 includes a second main server unit 44, and a second storage device 46 that is connected to the second main server unit 44. The second storage device 46 stores content data, output data (e.g., platemaking data, printing plate data, or proof data), job tickets (e.g., job definition format (JDF) files), color profiles, and color sample data, etc.

The printing press 42 produces a printed sheet 40 that is made up of images printed on a print medium 48. The print medium 48 may comprise a paper medium such as synthetic paper, thick paper, aluminum-evaporated paper, or the like, a resin medium such as vinyl chloride, polyethylene terephthalate (PET), or the like, or tarpaulin paper, metal sheeting, or the like.

If the printing press 42 comprises a proofer, then the printing press 42 may comprise a direct digital color proofer (DDCP), an ink jet color proofer, a low-resolution color laser printer (electrophotographic printer), an ink jet printer, or the like.

If the printing press 42 comprises a letterpress printing press, then the printing press 42 produces a printed sheet 40, which includes images printed on a print medium 48, by applying inks to the print medium 48 through printing plates 49 and non-illustrated intermediate transfer members.

If the printing press 42 comprises a digital printing press, then the printing press 42 can directly produce a printed sheet 40 without the need for generating printing plates 49. Such a digital printing press may comprise an ink jet printing press, a wide-format printing press, an ink jet color proofer, a color laser printer, or the like.

The printing site 14 also includes various other apparatus for performing various processes, including surface treatment, sheet folding, binding, cutting, etc., on a plurality of printed sheets 40, thereby processing the printed sheets 40 into a print 50, which typically is a casebound book according to the present embodiment.

[Electric Setup of Order-Receiving Server 24]

Figure 2:
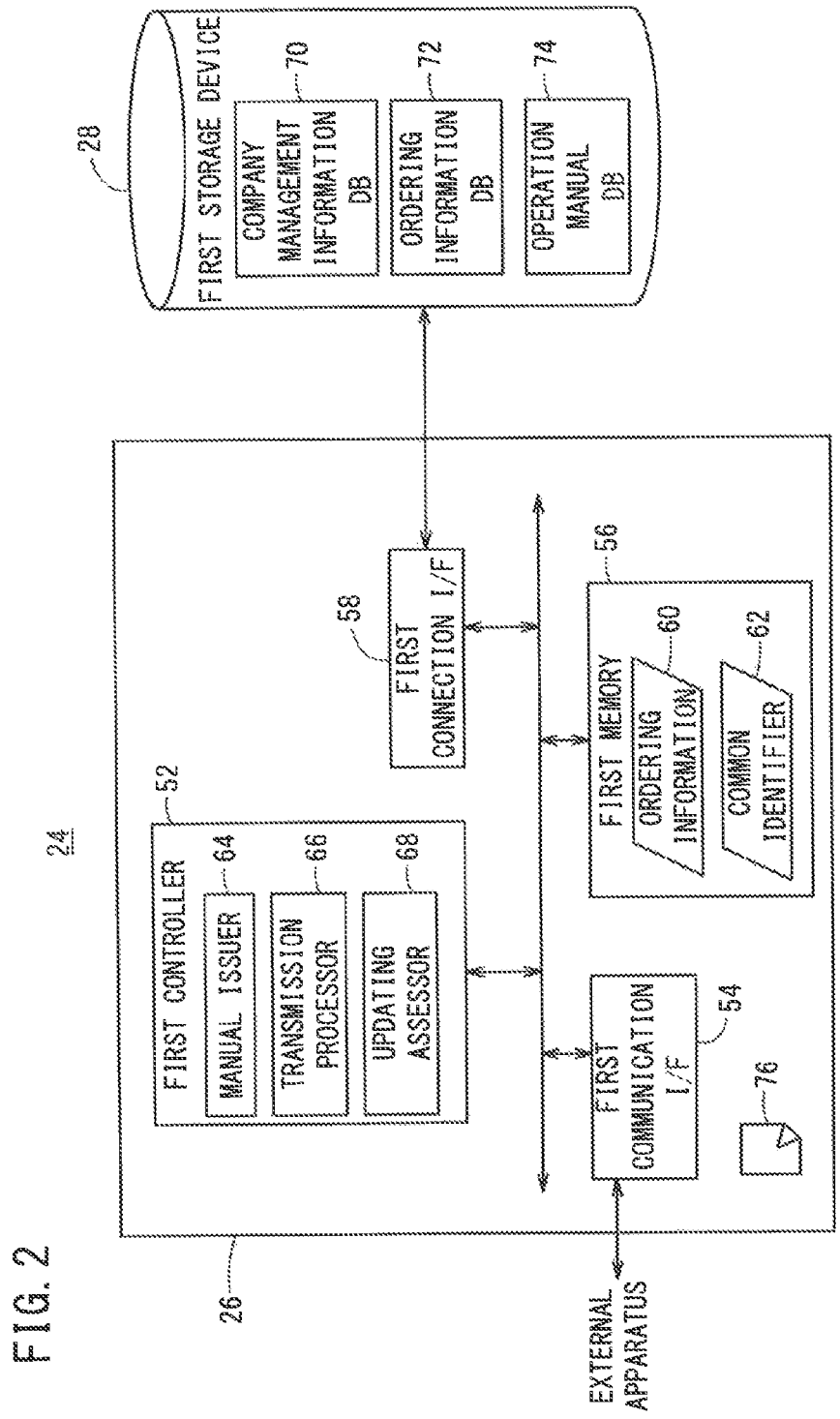
FIG. 2 is an electric block diagram of an order-receiving server shown in FIG. 1.

FIG. 2 shows in electric block form the order-receiving server 24 shown in FIG. 1. As shown in FIG. 2, the order-receiving server 24 includes a first main server unit 26, which basically comprises a computer having a first controller 52, a first communication interface (I/F) 54, a first memory 56 (storage medium), and a first connection I/F 58.

The first communication I/F 54 serves as an interface for sending electric signals to and receiving electric signals from an external apparatus. The first main server unit 26 can acquire various data, e.g., a common identifier 62, from the printing management server 36 (FIG. 1) through the first communication I/F 54. The first main server unit 26 also is capable of supplying various data, e.g., an electronic operation manual 76, to the printing management server 36 through the first communication I/F 54.

The first memory 56 stores programs and data required for the first controller 52 to control various components of the first main server unit 26. As shown in FIG. 2, the first memory 56 stores ordering information 60 concerning ordering of the print 50 together with a common identifier 62, which is an identifier that is used in common with the order-receiving server 24 and the printing management server 36.

The first memory 56 may comprise a non-transitory computer-readable storage medium. The computer-readable storage medium comprises a portable medium such as a magnetooptic disk, a ROM, a CD-ROM, a flash memory, or the like, or a storage medium such as a hard disk or the like incorporated in a computer system. The storage medium may also include a medium for dynamically holding programs for a short period of time, or a medium for holding programs for a certain period of time.

The first controller 52 comprises an information processing unit, i.e., a processor, such as a central processing unit (CPU) or the like. The first controller 52 reads and executes programs stored in the first memory 56 to thereby carry out various functions, including a manual issuer 64 for issuing an electronic operation manual 76, a transmission processor 66 for transmitting the electronic operation manual 76, and an updating assessor 68 for assessing whether or not job information 90 (FIG. 3) needs to be updated.

The first connection I/F 58 is an interface for sending data files to and receiving data files from the first storage device 28. The first storage device 28 is capable of supplying ordering information 60 associated with the common identifier 62, for example, in response to a request from the first main server unit 26.

As shown in FIG. 2, the first storage device 28 stores a database 70 of company management information (hereinafter referred to as a "company management information DB 70"), a database 72 of ordering information 60 (hereinafter referred to as an "ordering information DB 72"), and a database 74 of electronic operation manuals 76 (hereinafter referred to as an "operation manual DB 74").

The ordering information DB 72 contains an accumulation of management information, including received orders, sales, sales activities, estimates, annual production plans, monthly production plans, weekly and daily production plans, warehousing and shipping, inventories, stock purchasing, and costs.

The operation manual DB 74 contains an accumulation of electronic operation manuals 76, which are issued in relation to respective received orders. An electronic operation manual 76 is a data file representing an operation manual to be used for producing a print 50. The data format of the electronic operation manual 76 may be a general format such as Comma-Separated Values (CSV), eXtensible Markup Language (XML), or the like, or a freely defined format.

[Electric Setup of Printing Management Server 36]

Figure 3:
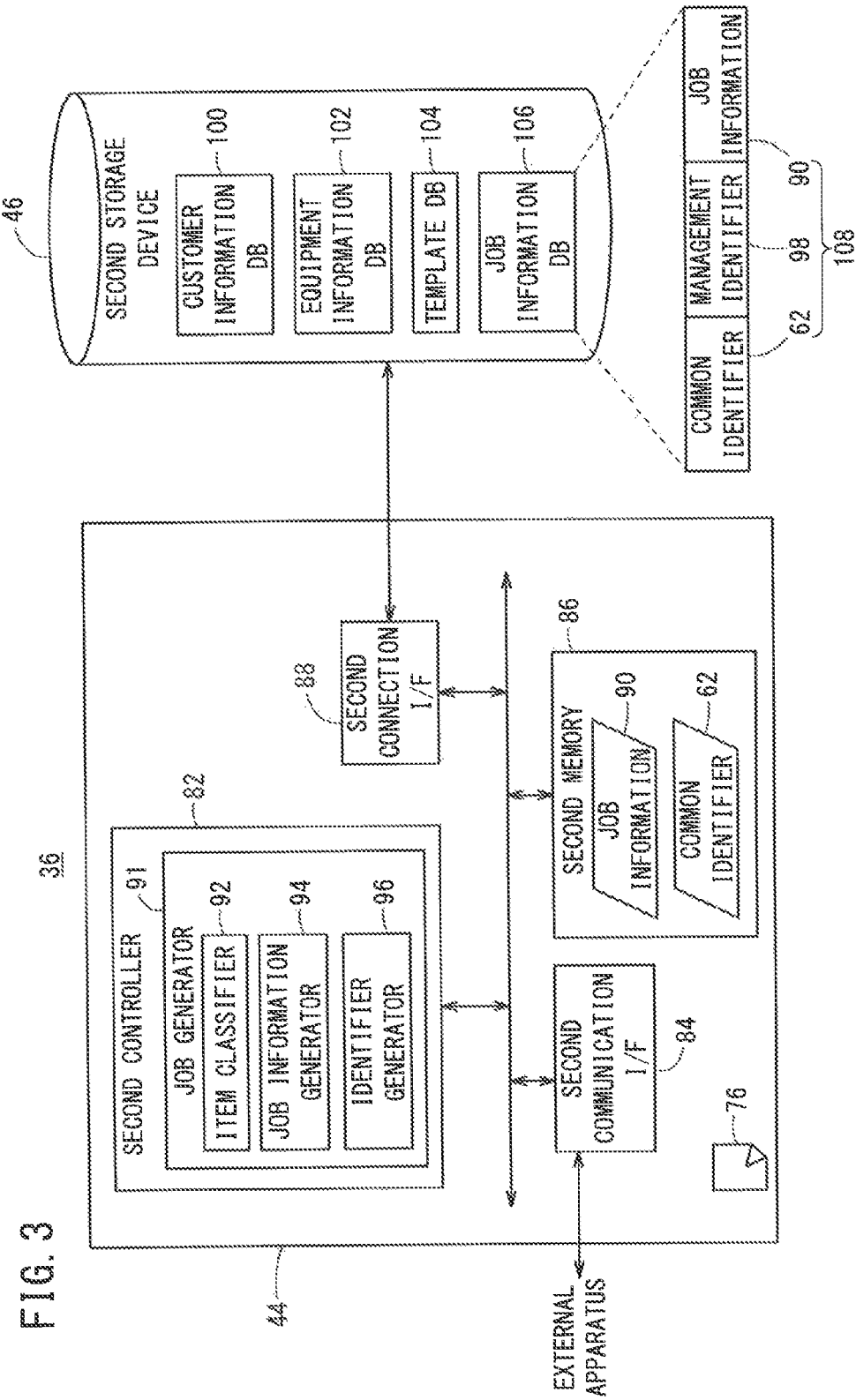
FIG. 3 is an electric block diagram of a printing management server shown in FIG. 1.

FIG. 3 shows in electric block form the printing management server 36 shown in FIG. 1. As shown in FIG. 2, the printing management server 36 includes a second main server unit 44 that basically comprises a computer having a second controller 82, a second communication I/F 84, a second memory 86 (storage medium), and a second connection I/F 88. The second main server unit 44 may have a configuration that is identical to or different from the configuration of the above-described first main server unit 26.

The second communication I/F 84 is an interface for sending electric signals to and receiving electric signals from an external apparatus. The second main server unit 44 can acquire various data, e.g., an electronic operation manual 76, from the order-receiving server 24 (FIG. 1) through the second communication I/F 84. The second main server unit 44 can also supply various data, e.g., job information 90, to the factory terminal apparatus 34 (FIG. 1) through the second communication I/F 84.

The second memory 86 stores programs and data required for the second controller 82 to control various components of the second main server unit 44. In FIG. 3, the second memory 86 stores job information 90 for identifying the content of a print job to be carried out, and the aforementioned common identifier 62.

The second controller 82 reads and executes programs stored in the second memory 86 to thereby carry out various functions of a job generator 91 for generating a print job. The functions of the job generator 91 include an item classifier 92 for classifying a plurality of items for identifying the content of a print job to be carried out, a job information generator 94 for generating job information 90, and an identifier generator 96 for generating a common identifier 62.

The second connection I/F 88 is an interface for sending data files to and receiving data files from the second storage device 46. The second storage device 46 is capable of supplying job information 90 associated with a management identifier 98 of a print job, for example, in response to a request from the second main server unit 44.

As shown in FIG. 3, the second storage device 46 stores a database 100 of customer information (hereinafter referred to as a "customer information DB 100"), a database 102 of equipment information (hereinafter referred to as an "equipment information DB 102"), a database 104 of template information (hereinafter referred to as a "template DB 104"), and a database 106 of job information 90 (hereinafter referred to as a "job information DB 106").

A record 108, which is shown at a lower right position below the second storage device 46 in FIG. 3, represents a constituent unit of data of the job information DB 106. The record 108 includes a common identifier 62, a management identifier 98, and job information 90.

[Operations of Print Production System 10]

The print production system 10 according to the present embodiment is configured basically as described above. Operations of the print production system 10 shown in FIG. 1 will be described in detail below primarily with reference to the sequence diagrams shown in FIGS. 4 and 8. The order-receiving server 24 shown in FIG. 2 and the printing management server 36 shown in FIG. 3 are capable of operating in cooperation with each other by executing installed application software.

(1. Generation of New Job Information 90)

Figure 4:
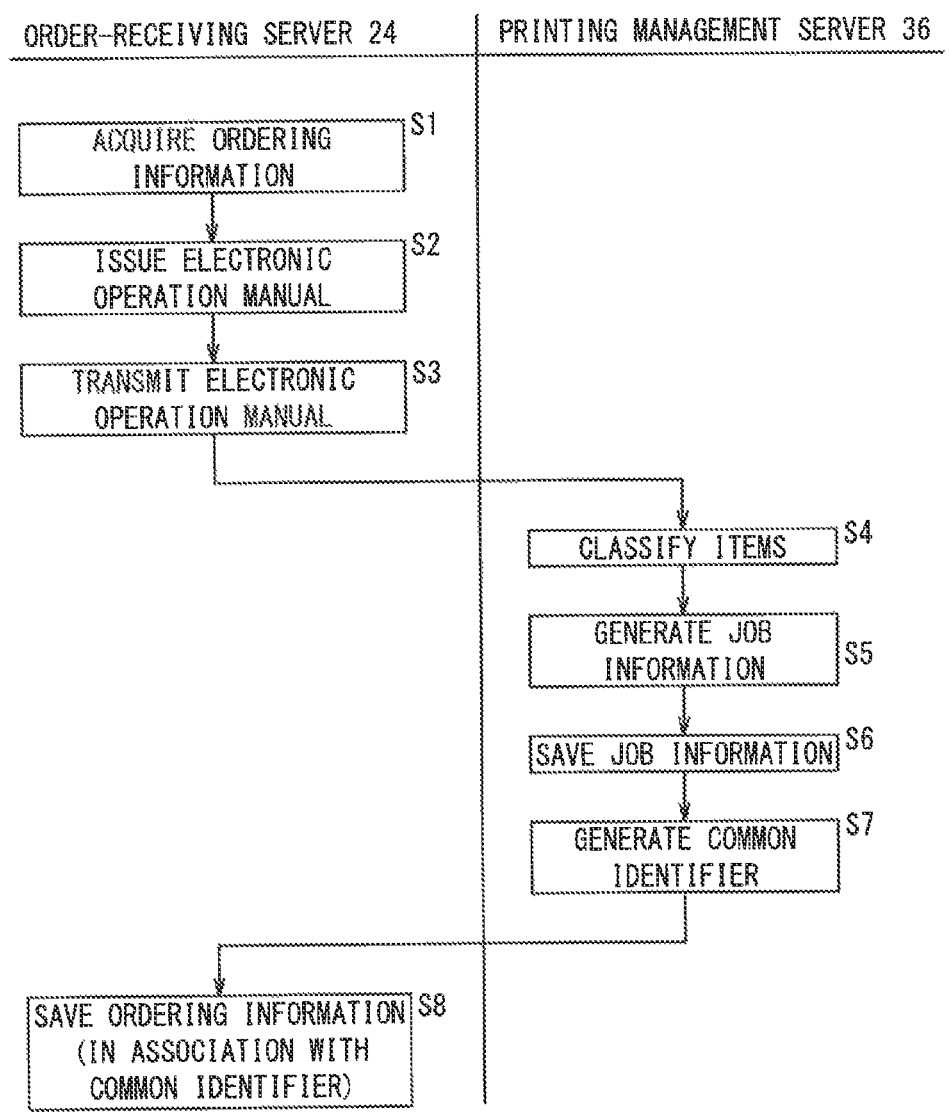
FIG. 4 is a first sequence diagram of an operation sequence of the print production system shown in FIG. 1.

First, a process of generating new job information 90 will be described below with reference to FIG. 4.

In step S1, in response to an instruction from the sales department terminal apparatus 22, the first main server unit 26 of the order-receiving server 24 acquires ordering information 60 for a print 50 from the sales department terminal apparatus 22 (or the ordering information DB 72). The ordering information 60 includes, for example, an ordering date, a product name, a product type, a quantity, a number of pages, a processed form, a finished size, colors, a delivery date, customer information, and contact details. However, the ordering information 60 is not limited to such pieces of information.

In step S2, on the basis of the ordering information 60 acquired in step S1, the manual issuer 64 of the order-receiving server 24 issues an electronic operation manual 76 to be used for producing a print 50. More specifically, the manual issuer 64 adds the ordering information 60 and related information (e.g., an order number, outsourcing specifications, the cost, and the number of man-hours acquired from the company management information DB 70), and produces a data file according to a predetermined format.

FIG. 5 is a diagram showing an example of data that makes up an electronic operation manual 76 shown in FIGS. 2 and 3. In FIG. 5, the electronic operation manual 76 is shown as a list of attributes (attributes) and content (instructed content) of data. An actual electronic operation manual 76 is based on the premise that a sequence of attributes is known, and only a certain plurality of types of instructed content are arranged in given a sequence. In FIG. 5, an order number, a product name, a delivery date, customer information, a number of pages, a finished size, a binding method, a medium size, a printing press name, and a proofer name are listed as attributes.

In step S3, the transmission processor 66 of the order-receiving server 24 transmits the electronic operation manual 76 (including the ordering information 60) that was generated and issued in step S2 to the printing management server 36. The second main server unit 44 receives the electronic operation manual 76 via the first communication I/F 54, the LAN 18, the router 20, the network 16, the router 32, the LAN 30, and the second communication I/F 84.

In step S4, the item classifier 92 of the printing management server 36 refers to the electronic operation manual 76 that was transmitted in step S3, and classifies a plurality of items that identify the content of the print job to be carried out. More specifically, the item classifier 92 classifies the items into certain items (hereinafter referred to as "specifiable items") that can be specified uniquely according to the electronic operation manual 76, and certain items (hereinafter referred to as "unspecifiable items") that cannot be specified uniquely according to the electronic operation manual 76.

FIG. 6A is a first diagram with respect to guidelines for determining the content of individual items. The items "JOB MANAGEMENT NUMBER", "JOB NAME", "DELIVERY DATE", and "CUSTOMER INFORMATION", which are shown in FIG. 6A, will be described by way of example.

It is assumed that the content of the item "JOB MANAGEMENT NUMBER" is of the same character string and format as the attribute "ORDER NUMBER" in the electronic operation manual 76. It is assumed that the content of the item "JOB NAME" is of the same character string and format as the attribute "PRODUCT NAME" in the electronic operation manual 76. It is assumed that the content of the item "DELIVERY DATE" is of the same value as the attribute "DELIVERY DATE" in the electronic operation manual 76. Further, the item "DELIVERY DATE" is of a format "SECONDS, MINUTES, HOURS, DAY, MONTH, YEAR". It also is assumed that the content of the item "CUSTOMER INFORMATION" is of a character string made up of "COMPANY NAME" on the electronic operation manual 76 and "NAME OF PERSON IN CHARGE" registered in the customer information DB 100 (FIG. 3).

According to the guidelines shown in FIG. 6A, the content of individual items is determined as shown in FIG. 6B. The items "JOB MANAGEMENT NUMBER", "JOB NAME", and "DELIVERY DATE" correspond to specifiable items, whereas the item "CUSTOMER INFORMATION" corresponds to an unspecifiable item.

FIG. 7A is a second diagram with respect to guidelines for determining the content of individual items. In FIG. 7A, the item "IMPOSITION PATTERN" will be described below by way of example.

(1) Before the content of the individual items is determined, a maximum value for the number of pages (hereinafter referred to as a "maximum page number") that can be laid out on one sheet is calculated from the content ("MEDIUM SIZE" and "FINISHED SIZE") of the electronic operation manual 76. (2) Then, an imposition pattern that matches with the "binding method" in the electronic operation manual 76 and the calculated "maximum page number" is selected from a plurality of templates registered in the template DB 104 (FIG. 3). (3) Thereafter, the above algorithm is applied successively to the remaining page numbers, the layouts of which have not yet been finalized, to thereby determine the content of the "IMPOSITION PATTERN" for all of the pages (content of the electronic operation manual 76).

Since the content of the imposition patterns is not determined uniquely by the electronic operation manual 76, the item "IMPOSITION PATTERN" corresponds to an unspecifiable item.

FIG. 7B is a third diagram with respect to guidelines for determining the content of individual items. In FIG. 7B, the item "WORKFLOW CONFIGURATION" will be described below by way of example.

The content of the item "WORKFLOW CONFIGURATION" is determined according to "MAPPING TABLE" and "APPARATUS INFORMATION", which are registered in the equipment information DB 102 (FIG. 3). The mapping table is an association table representing a relationship between "PRINT OUTPUT", "PROOF", and "WORKFLOW CONFIGURATION". Types of the printing press 42 that can be used for outputting prints include a conventional printing press including a letter-press printing press and a digital printing press. Types of the printing press 42 that can be used for producing proofs include a printing press for producing a print output (the same printing press used for outputting prints), an inkjet printing press, and a digital printing press.

The apparatus information represents information concerning the printing press 42 that can be used in the printing site 14 (FIG. 1). The apparatus information includes not only the name, identification number, date of use, availability, and installation site of the printing press 42, but also applicable information concerning the print medium 48 and the printing plates 49.

Since the content of the workflow configuration is not uniquely determined by the electronic operation manual 76, the item "WORKFLOW CONFIGURATION" corresponds to an unspecifiable item.

As described above, in step S4, the item classifier 92 classifies a plurality of items that make up the job information 90 into either "specifiable items" or "unspecifiable items". It should be noted that the "unspecifiable items" may include not only items that cannot be determined uniquely due to the presence of a plurality of available options, but also items that cannot be determined uniquely due to a lack of input values for the content thereof.

In step S5, the job information generator 94 of the printing management server 36 generates job information 90 according to prescribed guidelines. The job information generator 94 determines the content of items on the basis of the electronic operation manual 76, with respect to specifiable items among the plurality of items that make up the job information 90. The job information generator 94 also determines the content of unspecifiable items on the basis of search results of a reference database, using a portion of the information contained within the electronic operation manual 76 as a search condition.

The "reference database" implies a database made up of template information or other additional information concerning unspecifiable items, and corresponds to the customer information DB 100, the equipment information DB 102, or the template DB 104 shown in FIG. 3.

The customer information DB 100 contains an accumulation of various information including company names, addresses, telephone numbers, names of persons in charge, mail addresses, and rules and comments with respect to respective companies and persons in charge. For example, on the basis of the results (e.g., the name of a person in charge: XYZ) of a search of the customer information DB 100 carried out under the search conditions including "ABC CO.", etc., the job information generator 94 determines the content of "CUSTOMER INFORMATION" as being "ABC CO. XYZ" (see FIGS. 5 through 6B).

The template DB 104 stores an accumulation of various information including imposition patterns, job templates, and accessories. For example, on the basis of the results (e.g., a pattern name) of a search of the template DB 104 carried out under the search conditions including "maximum page number=(horizontal 4, vertical 2)", the job information generator 94 determines the content of "IMPOSITION PATTERN" (pattern name and page range) (see FIGS. 5 and 7A).

The equipment information DB 102 stores an accumulation of various information including equipment information and the mapping tables described above. For example, on the basis of the results of a search of the equipment information DB 102 carried out under the search conditions including "PRINTING PRESS P", "PRINTING PRESS Q", etc., the job information generator 94 determines the content of "WORKFLOW CONFIGURATION" (a workflow configuration and an assignment of the printing press 42) (see FIGS. 5 and 7B).

As described above, the job information generator 94 determines the content of one or more unspecifiable items, which have been classified according to the guidelines, thereby generating job information 90 that is descriptive of the print job (step S5).

In the above example, the content of all of the unspecifiable items is determined. However, only some of the unspecifiable items may be determined. More specifically, if there is no corresponding content, or if the probability of corresponding content for a given item is statistically low as a result of the search of the reference database, the job information generator 94 may set the content of the item to "NULL" (undetermined).

In step S6, the second main server unit 44 of the printing management server 36 newly registers and saves the job information 90 that was generated in step S5, thereby updating the job information DB 106. More specifically, the job information DB 106 adds one record 108, and stores the job information 90 in association with a management identifier 98 (e.g., a job management number "12345" as shown in FIG. 6B) inherent in the print job.

In step S7, upon generation of the new job information 90, the identifier generator 96 of the printing management server 36 generates a common identifier 62 inherent in the print job. The common identifier 62 is an identifier used in common with the order-receiving server 24 and the printing management server 36, and may be of a value that is the same as or different from the management identifier 98. In the illustrated example, it is assumed that the string "DEFGH" is generated as the common identifier 62.

Thereafter, the job information DB 106 stores the common identifier 62 in a prescribed area of the record 108 that was added in step S6, thereby storing the job information 90 and the management identifier 98 in association with the common identifier 62.

The second controller 82 sends the newly generated common identifier 62 to the order-receiving server 24. The first main server unit 26 receives the common identifier 62 through the second communication I/F 84, the LAN 30, the router 32, the network 16, the router 20, the LAN 18, and the first communication I/F 54.

In step S8, the first main server unit 26 of the order-receiving server 24 newly registers and saves the ordering information 60 that was acquired in step S1, thereby updating the ordering information DB 72. More specifically, the ordering information DB 72 stores the ordering information 60 in association with the common identifier 62 ("DEFGH"), which was transmitted in step S7, inherent in the print job. Similarly, the operation manual DB 74 stores the electronic operation manual 76 in association with the common identifier 62 ("DEFGH").

The process of generating new job information 90 is now brought to an end. The print production system 10 automatically generates job information 90 to be used for producing a print 50 without the need for workers (production personnel) of the printing site 14 to be involved in any way. Thereafter, the production personnel can download the job information 90 from the printing management server 36 through the factory terminal apparatus 34, whereupon the production personnel can confirm, modify, or approve the content of the job information 90.

(2. Automatic Updating of Job Information 90)

Figure 8:
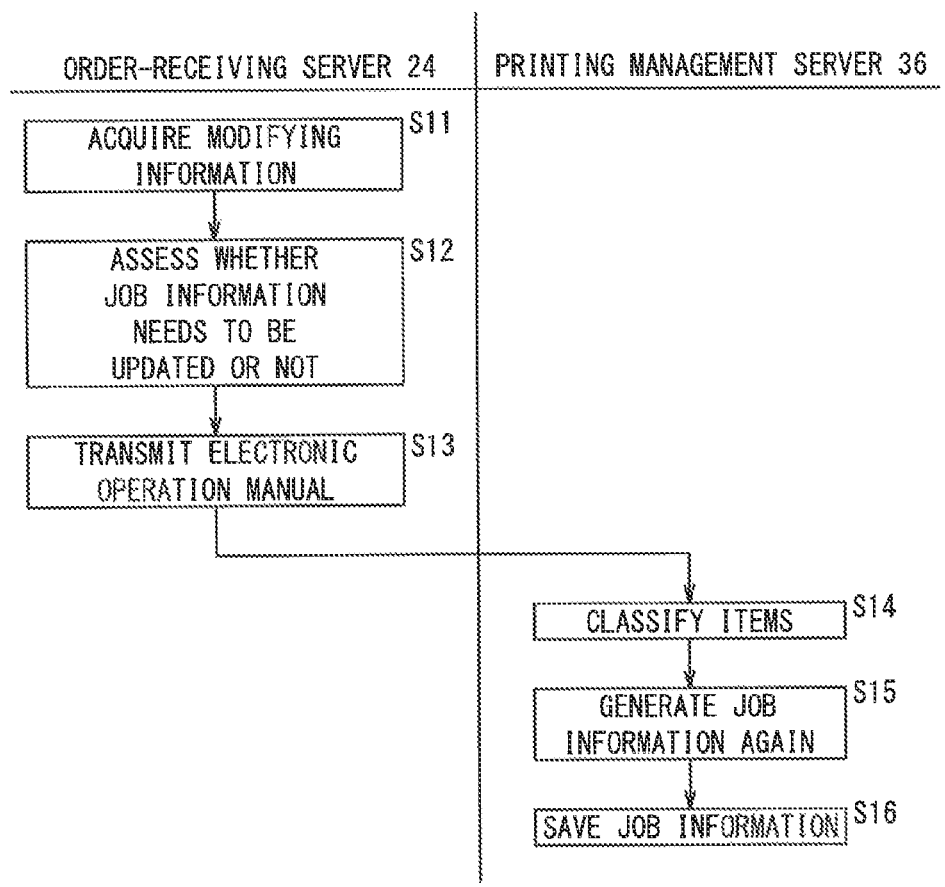
FIG. 8 is a second sequence diagram of an operation sequence of the print production system shown in FIG. 1.

A process of automatically updating job information 90 will be described below with reference to FIG. 8.

In step S11, in response to a modification instruction from the sales department terminal apparatus 22, the first main server unit 26 of the order-receiving server 24 acquires information (hereinafter referred to as "modifying information 110", see FIG. 9) representing modified content of the ordering information 60.

In step S12, on the basis of the modifying information 110 acquired in step S11, the updating assessor 68 of the order-receiving server 24 assesses whether or not the already generated job information 90 needs to be updated. For example, the updating assessor 68 reads the ordering information 60 stored in the ordering information DB 72, carries out a matching process between the ordering information 60 and the modifying information 110, and assesses whether or not the job information 90 needs to be updated on the basis of the result of the matching process.

In step S13, if the updating assessor 68 has determined that the job information 90 needs to be updated in step S12, then the transmission processor 66 of the order-receiving server 24 transmits an electronic operation manual 76 in which the modifying information 110 is reflected to the printing management server 36. Prior to transmission of the electronic operation manual 76, the manual issuer 64 issues an electronic operation manual 76 containing the modifying information 110, together with a common identifier 62 that corresponds to the modifying information 110. Then, the transmission processor 66 transmits the electronic operation manual 76, which is received and acquired by the second main server unit 44, in the same manner as in step S3 shown in FIG. 4.

In step S14, the item classifier 92 of the printing management server 36 refers to the electronic operation manual 76 that was transmitted in step S13, and classifies a plurality of items that identify the content of the print job to be carried out. Since step S14 is the same as step S4 shown in FIG. 4, details of step S14 will not be described below.

In step S15, the job information generator 94 of the printing management server 36 generates the job information 90 again in order to reflect the modifying information 110 included in the electronic operation manual 76. Before the job information 90 is newly generated, the job information generator 94 searches the job information DB 106 using the common identifier 62 as a search key, and reads one record 108 to be updated therefrom.

Figure 9:
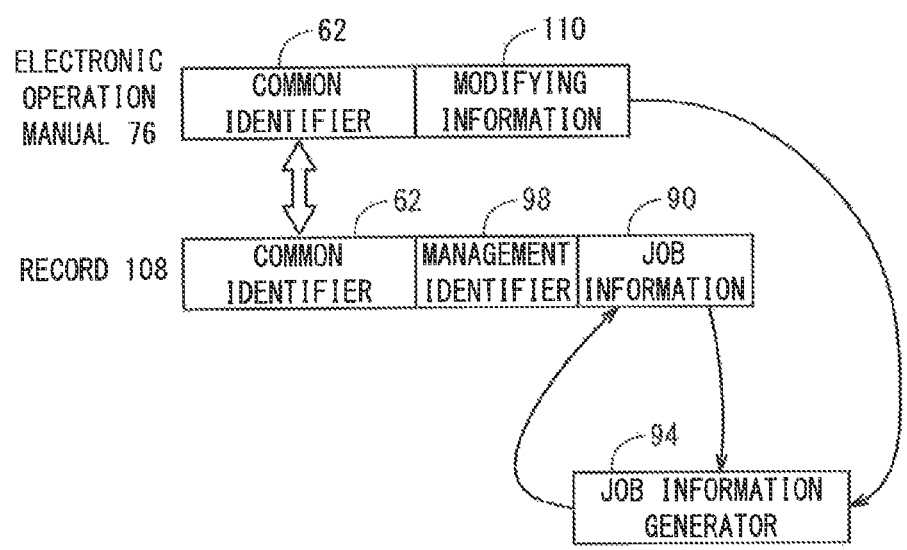
FIG. 9 is a diagram showing a data process flow at a time that job information is newly generated.

FIG. 9 is a diagram showing a flow of data processing at the time that the job information 90 is newly generated. The job information generator 94 acquires job information 90, which is included respectively in the modifying information 110 and the record 108 that are contained in the electronic operation manual 76. Thereafter, the job information generator 94 determines only the content of the items that are related to the modifying information 110, and updates the original job information 90 by way of overwriting the same, so as to generate new job information 90.

In step S16, the second main server unit 44 of the printing management server 36 saves the job information 90 that was newly generated in step S15, thereby updating the job information DB 106. At this time, the job information DB 106 updates the job information 90 by way of overwriting the same in a prescribed area of the record 108 to be updated.

The process of automatically updating the job information 90 is now brought to an end. The print production system 10 automatically updates the job information 90 depending on the ordering information 60 that is modified at the sales site 12, without the need for production personnel of the printing site 14 to be involved in any way.

[Advantages of the Present Embodiment]

As described above, the print production system 10 according to the present embodiment includes the order-receiving server 24 for managing the ordering information 60 for a print 50, and the printing management server 36 for managing the print job for producing the print 50.

The order-receiving server 24 includes the transmission processor 66 for transmitting the electronic operation manual 76 including the ordering information 60 to the printing management server 36. The printing management server 36 includes the item classifier 92 for classifying a plurality of items for identifying the content of a print job to be carried out into specifiable items that can be specified uniquely according to the electronic operation manual 76, and unspecifiable items that cannot be specified uniquely according to the electronic operation manual 76, the job information generator 94 for generating the job information 90 by determining the content of one or more unspecifiable items according to the guidelines, and the job information DB 106 for storing the generated job information 90 in association with the management identifier 98 of the print job.

The print production system 10, which is configured in the foregoing manner, is capable of automatically generating job information 90 in which a portion of the content of the electronic operation manual 76 is appropriately supplemented. Thus, the print production system 10 is effective to significantly reduce the number of man-hours required after the print 50 has been ordered and until the job information 90 is generated.

The printing management server 36 includes the identifier generator 96, which generates the common identifier 62 that is identical to or different from the management identifier 98, in the event that the job information 90 is newly generated by the job information generator 94. The job information DB 106 stores at least one of the job information 90 and the management identifier 98 in association with the common identifier 62. The order-receiving server 24 includes the ordering information DB 72, which stores the ordering information 60 in association with the common identifier 62. The introduction of the common identifier 62 allows information management to be achieved easily through the two apparatus.

The transmission processor 66 transmits the electronic operation manual 76, which includes the modifying information 110 for the ordering information 60 and the common identifier 62, to the printing management server 36. On the basis of the transmitted electronic operation manual 76, the job information generator 94 newly generates the job information 90 in which the modifying information 110 is reflected. The job information DB 106 updates the job information 90 depending on the common identifier 62, and stores the updated job information 90. Thus, since the job information 90 can be automatically updated, the number of man-hours required is further reduced.

The printing management server 36 includes the reference database (specifically, the customer information DB 100, the equipment information DB 102, and the template DB 104) for storing template information or additional information concerning unspecifiable items. The job information generator 94 generates the job information 90 by determining the content of the unspecifiable items on the basis of the results of a search of the reference database carried out under the search conditions represented by a portion of the information included in the electronic operation manual 76. In this manner, appropriate job information 90 can be obtained while taking various data into account.

[First Improvement of Printing Management Server 36]

A first improvement of the printing management server 36 (FIG. 3) will be described below with reference to FIGS. 10 and 11. Parts of the first improvement, which are identical to those of the above embodiment, are denoted by identical reference characters, and such features will not be described in detail below. This also holds true for a second modification, to be described later.

[Electric Setup of Printing Management Server 36A]

Figure 10:
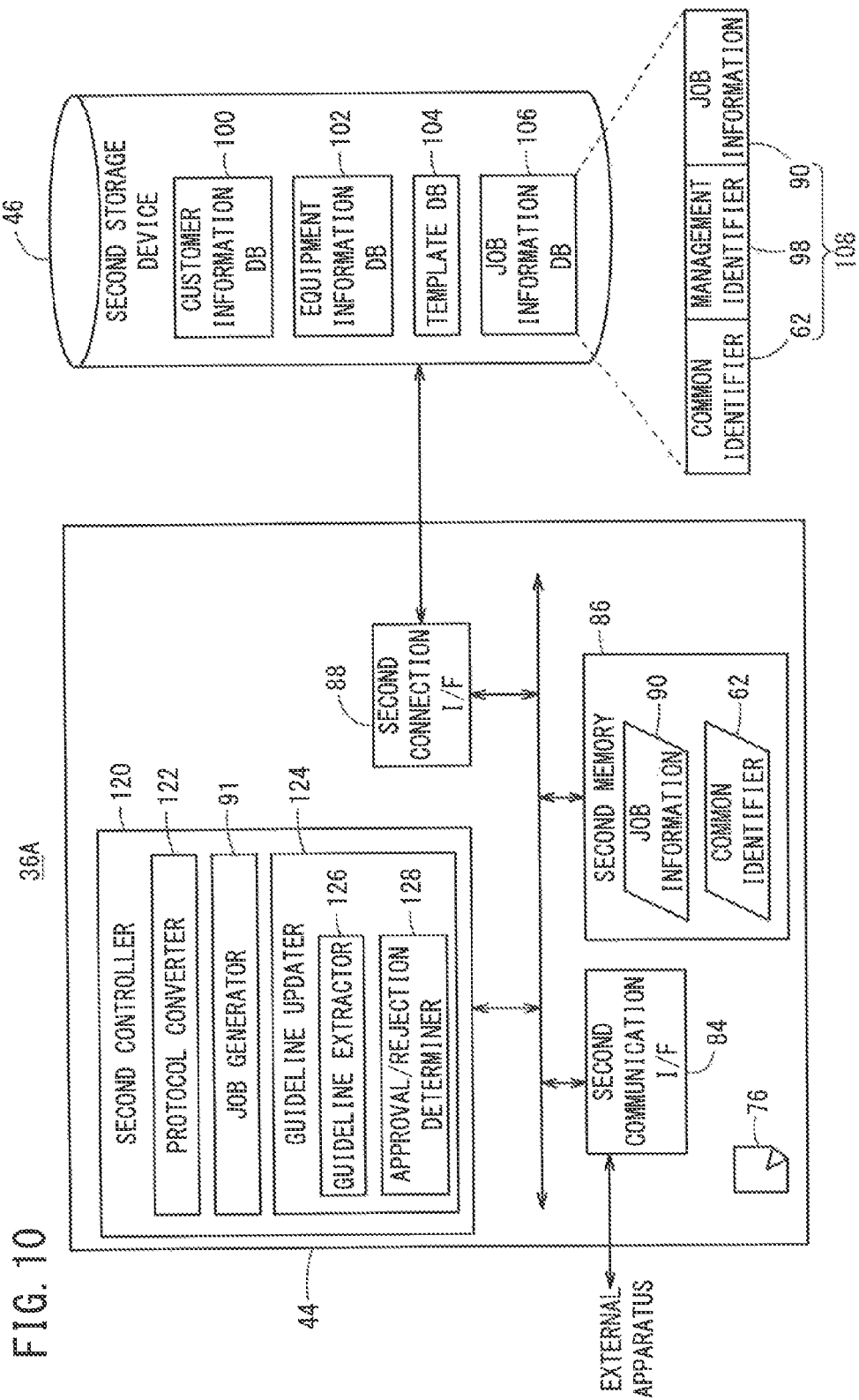
FIG. 10 is an electric block diagram of a printing management server according to a first improvement.

FIG. 10 is an electric block diagram of a printing management server 36A according to the first improvement. The printing management server 36A basically is identical in configuration to the printing management server 36 (FIG. 3), except for certain functions performed by a second controller 120.

The second controller 120 reads and executes programs that are stored in the second memory 86, so as to carry out various functions including not only the job generator 91, but also a protocol converter 122 for converting the data format of an electronic operation manual 76, and a guideline updater 124 (including a guideline extractor 126 and an approval/rejection determiner 128) for updating guidelines by which the content of the unspecifiable items is determined.

[Operations of Second Controller 120]

Figure 11:
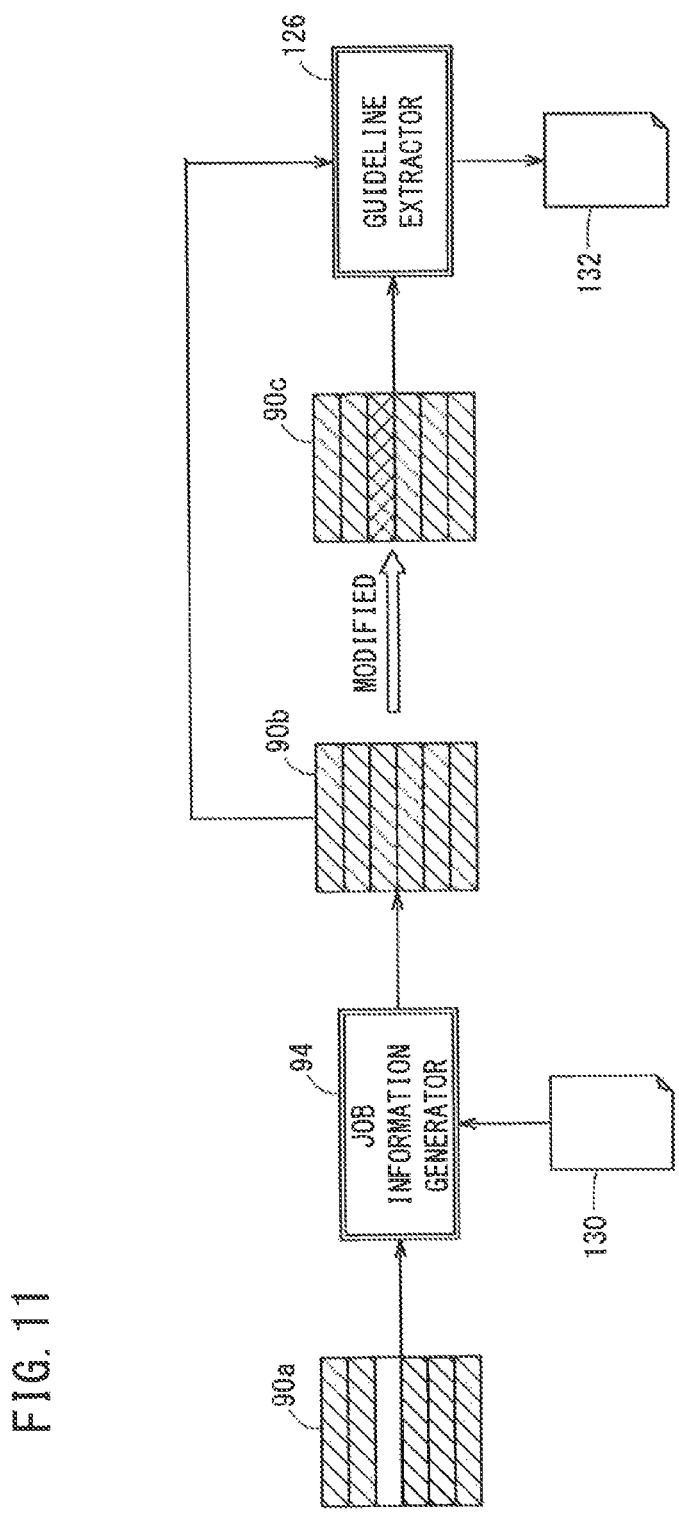
FIG. 11 is a block diagram illustrating an operation sequence of a second controller shown in FIG. 10.

FIG. 11 is a block diagram illustrating an operation sequence of the second controller 120 shown in FIG. 10. In particular, FIG. 11 shows a process flow of normalized job information 90a, original job information 90b, and new job information 90c.

[1] The protocol converter 122 converts the data format of the electronic operation manual 76, which was transmitted from the transmission processor 66 (FIG. 2) of the order-receiving server 24, according to a data protocol for normalizing the data formats of a plurality of types of electronic operation manuals 76. The normalization of data formats is not limited to making file formats uniform, but may include making some formats common therein (e.g., the number of parameters, a range of values, and an arrangement sequence).

More specifically, the protocol converter 122 extracts necessary information depending on the format of the received electronic operation manual 76, and converts the extracted information into an interim format. Therefore, even an electronic operation manual 76 having a different format can be edited, e.g., overwritten, added, or modified, using common databases and programs.

Next, the protocol converter 122 converts the content of the electronic operation manual 76, which has been edited in the interim format, into a JDF/JMF (Job Messaging Format) protocol that serves as a common format for printing.

In this fashion, the protocol converter 122 converts an electronic operation manual 76 having a data format including CSV, XML, and JDF into normalized job information 90a defined according to JDF/JMF. Since the difference between the data formats of electronic operation manuals 76 can be eliminated by such preprocessing, or more specifically, by normalizing the electronic operation manuals 76, a process of automatically generating job information 90 can be carried out.

FIG. 11 schematically shows six data areas that make up the normalized job information 90a. Among the six data areas, the rectangles shown in hatching represent items whose content have been determined, whereas the blank rectangle represents an item whose content has not yet been determined. The former items correspond to specifiable items, whereas the latter item corresponds to an unspecifiable item.

[2] Next, the job information generator 94 determines the content of the unspecifiable item according to an original guideline table 130, thereby generating original job information 90b. The content that makes up the items of the original job information 90b has been determined beforehand.

[3] Next, the content of the original job information 90b is modified in order to obtain new job information 90c. More specifically, the production personnel or the user downloads the original job information 90b through the factory terminal apparatus 34, and performs an action to modify some or all of the content of the original job information 90b. The rectangle shown in cross-hatching represents an item whose content has been modified.

[4] Next, the guideline extractor 126 extracts a new guideline table 132, which differs from the original guideline table 130, on the basis of differential information between the original job information 90b and the new job information 90c. In the new guideline table 132, a guideline concerning the above-noted third item has been modified. If plural items are modified simultaneously, then table data based on a combination of two or more items may be generated.

[5] Next, the approval/rejection determiner 128 assesses whether updating of the guideline is approved or rejected in response to an action taken by the production personnel. More specifically, the production personnel confirm the content of the new guideline table 132 through the factory terminal apparatus 34, and an action is taken to decide whether or not a modification of the guideline should be approved.

[6] If the guideline updater 124 receives a prescribed action taken by the production personnel, or more specifically, if a deciding action to approve updating of the guideline is received, the guideline updater 124 updates the original guideline table 130 by overwriting the same with a new guideline. At this time, the updated content of the guideline is reflected in the various databases. If the guideline updater 124 receives a deciding action taken by the production personnel so as not to approve updating of the guideline, the content of the original guideline table 130 is kept as is without updating.

The timing of such updating is not limited to occurring in a case where a deciding action is received, as described above, but may be in a case where the total number of times that the same content has been updated exceeds a threshold value. Alternatively, a judgment provided by the production personnel is not required, and the guidelines may be updated automatically.

[7] Thereafter, the job information generator 94 determines the content of the unspecifiable item according to the new guideline table 132 that was updated by the guideline updater 124, thereby generating new job information 90c.

As described above, the printing management server 36A may further include the guideline updater 124 for updating the guidelines, and the job information generator 94 may generate new job information 90c according to the guidelines (new guideline table 132) updated by the guideline updater 124. Inasmuch as the job information 90 appropriately reflects a modification of the guidelines, which occurs as the situation changes, the adequacy of the job information 90 increases.

[Second Improvement of Printing Management Server 36]

A second improvement of the printing management server 36 (FIG. 3) will be described below with reference to FIGS. 12 through 16.

[Electric Setup of Printing Management Server 36B]

Figure 12:
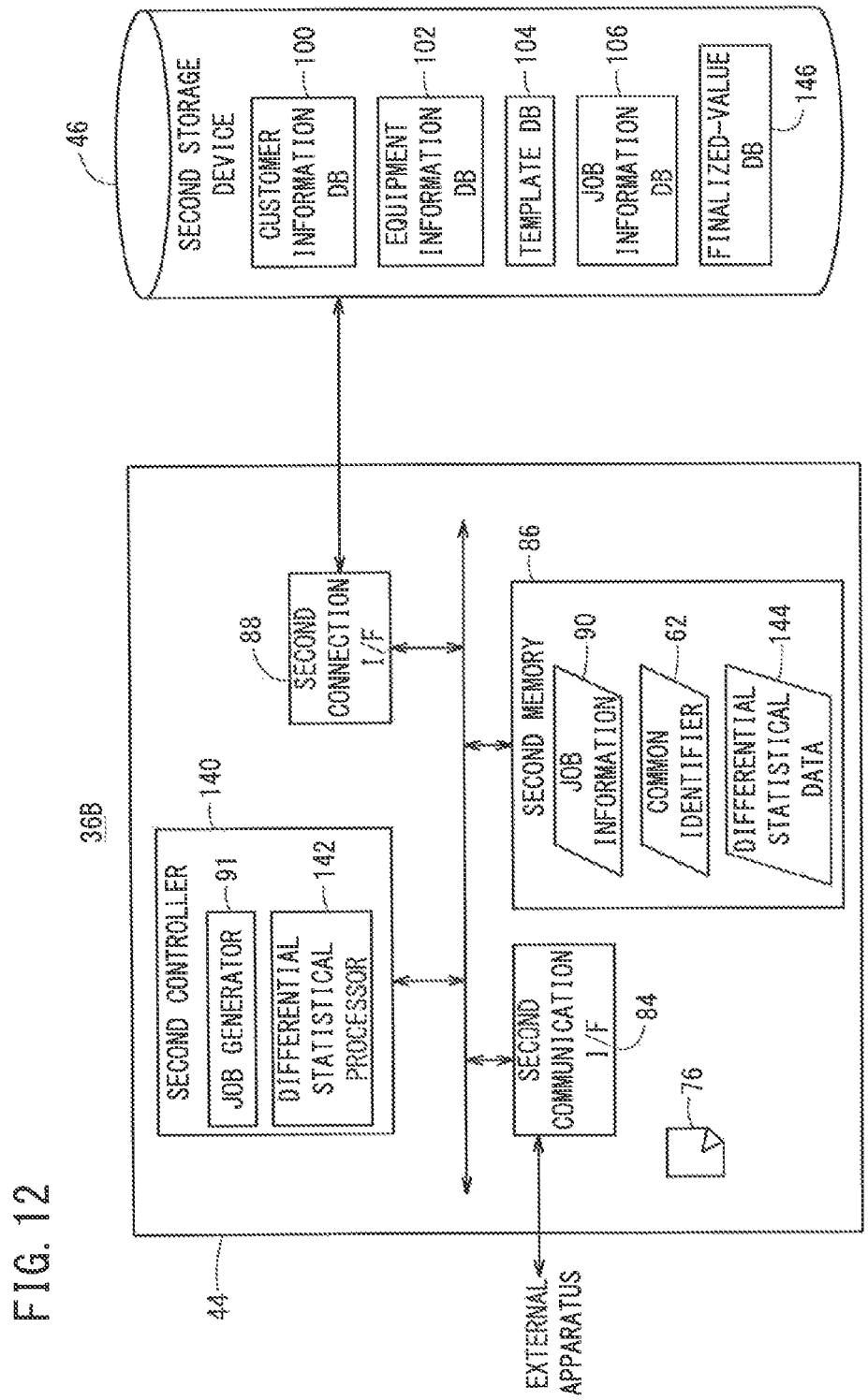
FIG. 12 is an electric block diagram of a printing management server according to a second improvement.

FIG. 12 is an electric block diagram of a printing management server 36B according to the second improvement. The printing management server 36B basically is identical in configuration to the printing management server 36 (FIG. 3), except for the functions performed by a second controller 140.

The second controller 140 reads and executes programs that are stored in the second memory 86, thereby carrying out various functions including not only the job generator 91, but also a differential statistical processor 142 for performing a prescribed statistical process on various data.

The second memory 86 stores the job information 90, the common identifier 62, and differential statistical data 144, to be described later. The second storage device 46 stores the customer information DB 100, the equipment information DB 102, the template DB 104, the job information DB 106, and a database 146 of finalized-value data 164 (FIG. 13) (hereinafter referred to as a "finalized-value DB 146").

[Electric Setup of Factory Terminal Apparatus 34]

Figure 13:
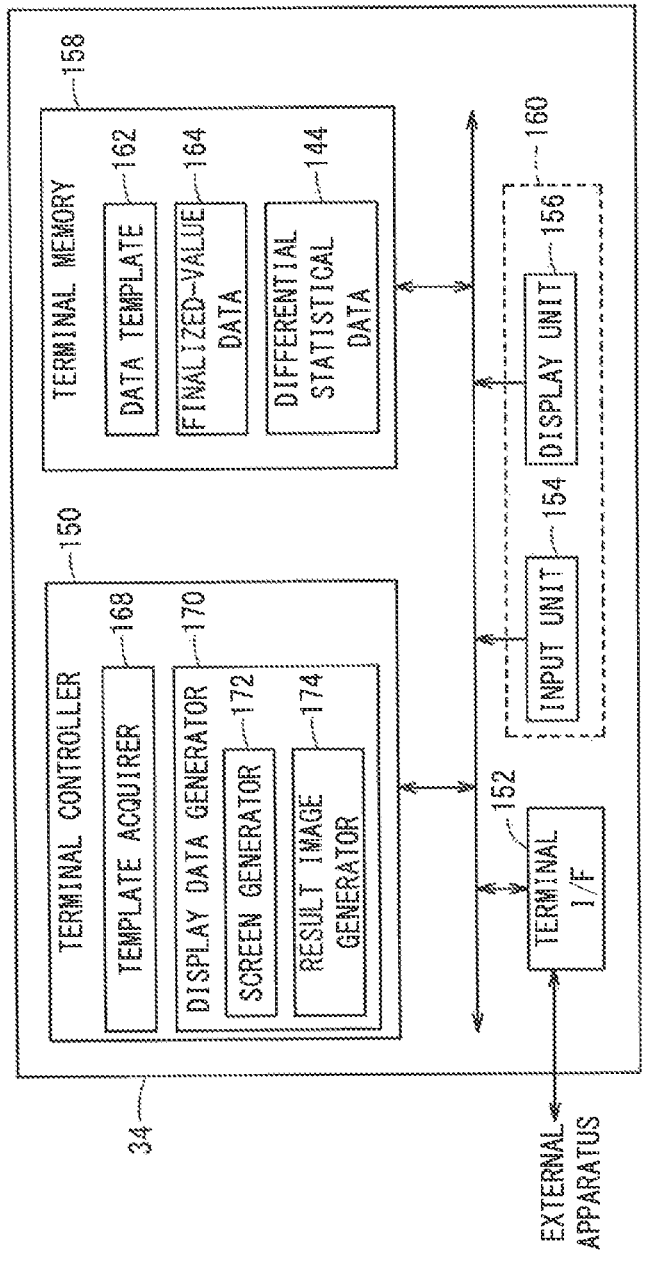
FIG. 13 is an electric block diagram of a factory terminal apparatus shown in FIG. 1.

FIG. 13 is an electric block diagram of the factory terminal apparatus 34 shown in FIG. 1. The factory terminal apparatus 34 basically comprises a computer having a terminal controller 150, a terminal I/F 152, an input unit 154, a display unit 156, and a terminal memory 158.

The terminal I/F 152 is an interface for sending electric signals to and receiving electric signals from an external apparatus. The factory terminal apparatus 34 is capable of acquiring various data, e.g., a data template 162, from the printing management server 36B (FIG. 12) through the terminal I/F 152, and is capable of supplying various data, e.g., finalized-value data 164, to the printing management server 36B through the terminal I/F 152.

The input unit 154 comprises various input devices including a mouse, a track ball, a keyboard, and a touch sensor, etc. The display unit 156 is an output device based on any of various principles, which may comprise a liquid crystal display panel, an organic electroluminescence (EL) display panel, and a cathode-ray tube (CRT). The input function of the input unit 154 and the display function of the display unit 156 are combined with each other, thereby making up a user interface 160 that allows the user to change the parameter values.

The terminal memory 158 stores programs and data required for the terminal controller 150 to control various components of the factory terminal apparatus 34. In FIG. 13, the terminal memory 158 stores the differential statistical data 144, the data template 162, and the finalized-value data 164. The data template 162 refers to a set of initial parameter values. The data format of the initial values (or finalized values, to be described later) is not limited to numerals, but may comprise character strings, for example.

The terminal controller 150 reads and executes programs that are stored in the terminal memory 158, thereby carrying out various functions including a template acquirer 168 for acquiring the data template 162 to be called up, and a display data generator 170 (including a screen generator 172 and a result image generator 174) for generating display data for displaying various images such as an image of a window W1 (FIG. 14, etc.) and an image of a window W2 (FIG. 16).

[Operations of Printing Management Server 36B and Factory Terminal Apparatus 34]

Operations of the printing management server 36B and the factory terminal apparatus 34 will be described in detail below with reference to the block diagrams shown in FIGS. 12 and 13 and FIGS. 14 through 16.

Prior to producing a print 50, the production personnel generate job information 90 (specifically, a job ticket) suitable for the print 50. At this time, it is assumed that a template name, which is closest to the form in which the print job should be carried out, is selected from among a plurality of template names (data template 162) that have been registered in advance in the template DB 104.

[1] First, the factory terminal apparatus 34 acquires a data template 162 that is linked to the selected template name. Prior to acquisition thereof, the factory terminal apparatus 34 sends a request signal for requesting a data template 162 having a template name "Original Template" through the terminal I/F 152 to the printing management server 36B. The printing management server 36B receives the request signal through the LAN 30 and the second communication I/F 84.

Thereafter, the second controller 140 reads the data template 162 from the second storage device 46 (template DB 104), and sends communication data including the data template 162 to the factory terminal apparatus 34. Thus, the terminal controller 150 (template acquirer 168) can acquire the data template 162 that is linked to the template name "Original Template".

[2] Next, the user interface 160 calls up the acquired data template 162, and displays a set of initial parameter values on an input screen 180. More specifically, in response to an instruction to start a setting and inputting process, the screen generator 172 generates display data for an input screen 180, and then outputs the generated display data to the display unit 156. The display unit 156 displays a window W1 including the input screen 180.

Figure 14:
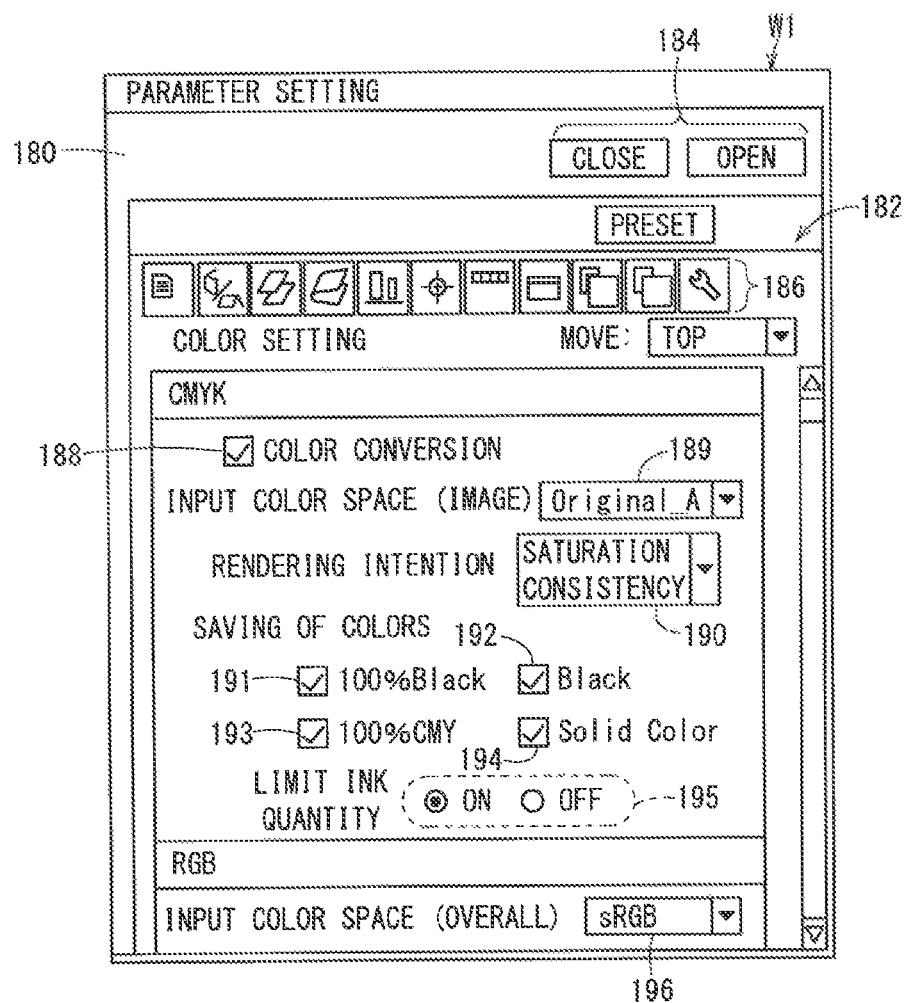
FIG. 14 is an image diagram showing a parameter setting screen.

As shown in FIG. 14, the input screen 180 includes a variable setting field 182 for setting a plurality of parameters, and a button group 184 having buttons marked "CLOSE" and "SAVE", respectively. The production personnel can enter various settings by operating the input unit 154 (FIG. 13).

The variable setting field 182 includes an icon group 186 having a plurality of menu ions and a plurality of user controls 188 through 196. The user control 188 is a check box for selecting whether or not a color conversion should be made ("YES" in FIG. 14) for CMYK images. The user control 189 is a pull-down menu for selecting one ("Original_A" in FIG. 14) of the types of input color spaces to be applied to the content of the image. The user control 190 is a pull-down menu for selecting one ("SATURATION CONSISTENCY" in FIG. 14) of the types of rendering intentions.

The user controls 191 through 194 are check boxes for selecting whether or not a specific color should be saved ("YES" in FIG. 14) after a color conversion process has been carried out. The user control 195 is a radio button for selecting whether an ink quantity limiting process should be turned on or off ("ON" in FIG. 14). The user control 196 is a control box for selecting one ("sRGB" in FIG. 14) of the types of input color spaces to be applied to the overall image.

[3] Next, the factory terminal apparatus 34 sets various parameters through the user interface 160. For example, the displayed form (selected parameter values) of the input screen 180 shown in FIG. 14 changes in response to actions on the two user controls 190, 195.

In response to clicking action on the button group 184, or more specifically the "SAVE" button, the terminal controller 150 temporarily stores the parameter values, which are currently selected on the input screen 180, as finalized-value data 164 in the terminal memory 158. The factory terminal apparatus 34 then transmits communication data including the finalized-value data 164 through the terminal I/F 152 to the printing management server 36B.

The second controller 140 supplies the finalized-value data 164 obtained from the received communication data through the second connection I/F 88 to the second storage device 46. Accordingly, the second storage device 46 saves the finalized-value data 164 based on the current settings, thereby accumulating the finalized-value data 164 in the finalized-value DB 146.

[4] The factory terminal apparatus 34 incorporates a mode for assisting in setting parameters (setting assistance mode). While the setting assistance mode is being activated, the factory terminal apparatus 34 transmits a request signal for requesting the data template 162 having the template name "Original Template" through the terminal I/F 152 to the printing management server 36B.

The second controller 140 acquires the data template 162 that is linked with the template name "Original Template", and a plurality of finalized-value data 164. The plurality of finalized-value data 164 correspond to finalized-value data 164 that have been set a plurality of times in the past, and which have been finally set after the data template 162 was called up as initial values.

[5] Next, the differential statistical processor 142 performs a prescribed statistical process on various data that was acquired previously. The statistical process performed by the differential statistical processor 142 will be described in detail below.

Figure 15:
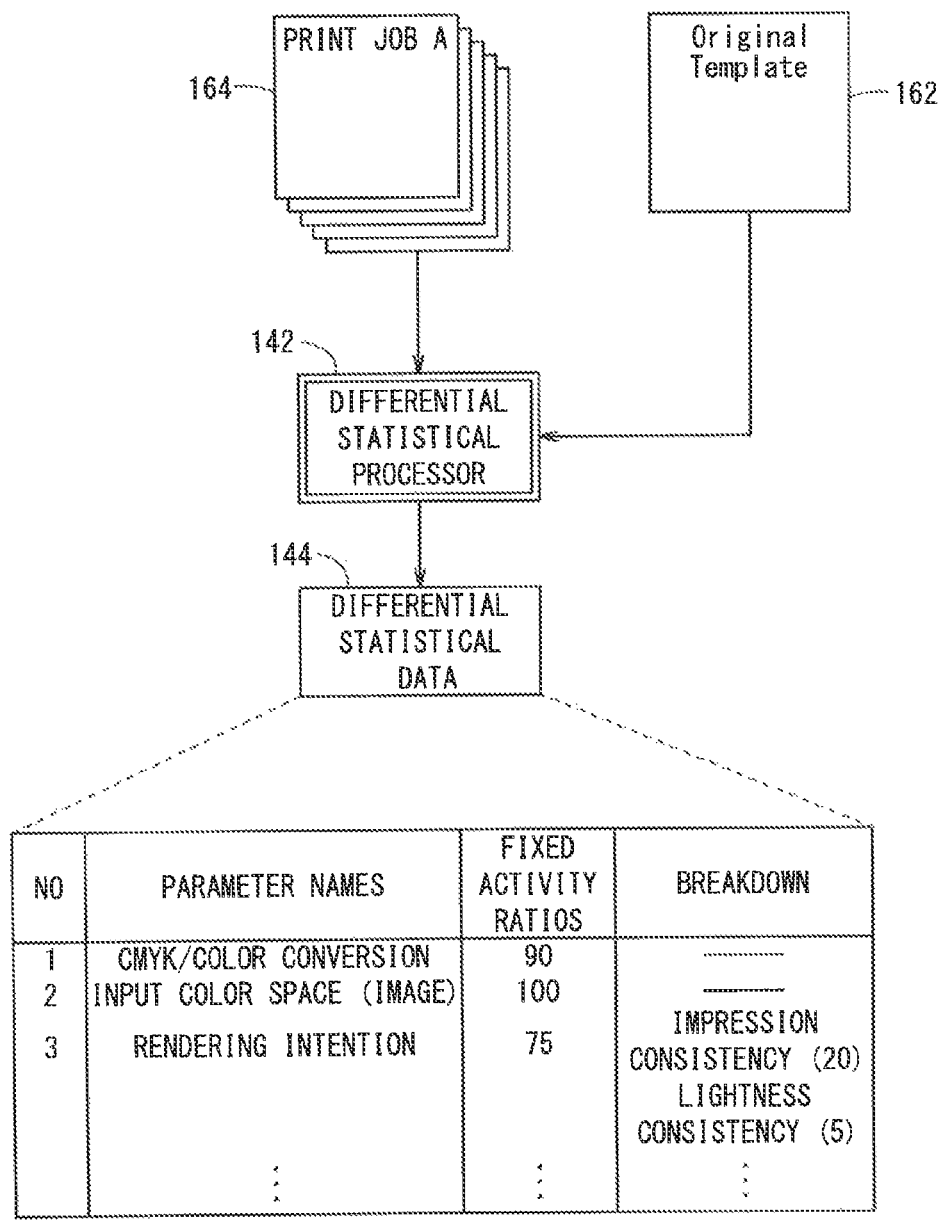
FIG. 15 is a block diagram illustrating an operation sequence of a differential statistical processor shown in FIG. 12.

As shown in FIG. 15, the differential statistical processor 142 outputs differential statistical data 144 by performing a statistical process on differential data between the finalized-value data 164 and the data template 162. In this case, the term "statistical process" refers to a computational process based on statistical principles.

In FIG. 15, the differential statistical data 144 represent fixed activity ratios (units: %) and a breakdown. A fixed activity ratio represents a proportion at which an initial value is set as is without being changed, and is determined as 100×(the number of data at which a finalized value is equal to an initial value)/(the number of all data). In FIG. 15, if the initial value of "RENDERING INTENTION" for the template name "Original Template" represents "SATURATION CONSISTENCY", then the proportion at which "SATURATION CONSISTENCY" is used without being changed is 75%, and the proportions at which "SATURATION CONSISTENCY" is changed to "IMPRESSION CONSISTENCY" and "LIGHTNESS CONSISTENCY" are 20% and 5%, respectively.

The differential statistical data 144 may represent a statistical distribution, which includes a histogram or at least one of statistical quantities including a mean, a mode, a median, a maximum, and a minimum, for example. A population, a number of parameters, and a combination, which are used in the statistical process, may be changed as desired.

[6] Next, the printing management server 36B and the factory terminal apparatus 34 perform a process of transmitting and receiving the differential statistical data 144. More specifically, the printing management server 36B transmits communication data including the differential statistical data 144 to the factory terminal apparatus 34 through the second communication I/F 84. The factory terminal apparatus 34 receives the communication data through the LAN 30 (FIG. 1) and the terminal I/F 152. Thereafter, the terminal controller 150 temporarily stores the differential statistical data 144 included in the communication data in the terminal memory 158.

[7] Finally, the user interface 160 displays the results of the statistical process, which has previously been carried out. More specifically, the result image generator 174 reads the differential statistical data 144 from the terminal memory 158, and generates result images 204 through 206 using the differential statistical data 144. The screen generator 172 generates display data for the window W2 (including the result image 204, etc.) and outputs the generated display data to the display unit 156. Accordingly, the display unit 156 displays the window W2 that includes a setting assistance screen 200.

As shown in FIG. 16, the window W2 is disposed in a peripheral area on the ride side of the window W1. The setting assistance screen 200 includes a result display field 202 showing the results of the statistical process. More specifically, the result display field 202 includes a result image 204 concerning "COLOR CONVERSION", a result image 205 concerning "IMPOSITION", and a result image 206 concerning "OVERPRINT", which are arranged successively from above. The result images 204, 205, 206, which represent the respective parameters, include histograms 208 and character strings 210 representing visualized activity ratios (units: %) that took place in the past.

If the production personnel select the template "Original Template" while viewing the result image 204, the production personnel can recognize that the proportion set with the color conversion "YES" is 90%, whereas the proportion set with the color conversion "NO" is 10%. Therefore, using the statistical data in the past as a clue, the production personnel can easily judge which values are to be set for the print job being edited.

As described above, the user interface 160 may display the result image 204 simultaneously with the user controls 188 through 196 for facilitating changes in the values of the parameters to be handled in the statistical process. Such a simultaneous display is convenient for production personnel, because it allows the production personnel to change the values of the parameters while viewing the result image 204. The simultaneous display also is advantageous in that, by analyzing statistical data that have been used in the past, the production personnel can confirm whether or not the guidelines for determining unspecifiable items are appropriate.

The aforementioned simultaneous display of images is not limited to displaying images at the same time. The images may be displayed in a way that allows production personnel to view the images at once. For example, the images may be displayed at once in separate windows W1 and W2, or the images may be displayed in one window. Further, the images may be displayed in a window while enabling switching therebetween in response to clicking on a tab provided in the window. Alternatively, the images may be displayed alternately at given time intervals in a flip display mode.

Although preferred embodiments of the present invention have been described above, the present invention is not limited to the illustrated embodiments, but many changes and modifications may be made to the embodiments without departing from the scope of the invention as set forth in the appended claims.

What is claimed is:

1. A print production system comprising an order-receiving server for managing ordering information for a print, and a printing management server for managing a print job for producing the print, wherein:
the order-receiving server includes a transmission processor for transmitting an electronic operation manual including the ordering information to the printing management server; and
the printing management server includes:
an item classifier for classifying a plurality of items for identifying content of the print job to be carried out into specifiable items that can be specified uniquely according to the electronic operation manual transmitted from the transmission processor, and unspecifiable items that cannot be specified uniquely according to the electronic operation manual;
a job information generator for generating job information descriptive of the print job by determining content of one or more unspecifiable items classified by the item classifier according to guidelines; and
a job information database for storing the job information that is generated by the job information generator in association with a management identifier of the print job, wherein the printing management server further includes:
a reference database for storing template information or additional information concerning the unspecifiable items; and
wherein the job information generator generates the job information by determining content of the unspecifiable items, on the basis of results of a search of the reference database, which is carried out under search conditions represented portion of the information included in the electronic operation manual.

2. The print production system according to claim 1, wherein the printing management server further includes:
an identifier generator for generating a common identifier, which is identical to or different from the management identifier, in the event that the job information is newly generated by the job information generator;
the job information database stores at least one of the job information and the management identifier in association with the common identifier that is generated by the identifier generator; and
the order-receiving server includes an ordering information database for storing the ordering information in association with the common identifier.

3. The print production system according to claim 2, wherein the transmission processor transmits the electronic operation manual to the printing management server, the electronic operation manual including modifying information for the ordering information and the common identifier, which are stored in the ordering information database;
the job information generator newly generates the job information in which the modifying information is reflected, on the basis of the electronic operation manual transmitted from the transmission processor; and
the job information database updates the job information depending on the common identifier.

4. The print production system according to claim 1, wherein the printing management server further includes:
a guideline updater for updating the guidelines; and
the job information generator generates the job information according to the guidelines that are updated by the guideline updater.

5. The print production system according to claim 4, wherein the guideline updater updates the guidelines by extracting new guidelines that differ from original guidelines on the basis of differential information between original job information generated according to the original guidelines and new job information produced by changing the content of the original job information.

6. The print production system according to claim 4, wherein the guideline updater updates the guidelines if the guideline updater receives an action taken by a user of the print production system.

7. The print production system according to claim 1, further comprising:
a protocol converter for converting a data format of the electronic operation manual transmitted to the protocol converter, according to a data protocol for normalizing data formats of a plurality of types of electronic operation manuals.

8. The print production system according to claim 1, further comprising:
a terminal apparatus for communicating with the printing management server;
wherein the terminal apparatus includes:
a user interface for referring to the job information database, calling up a data template representing a set of initial values of parameters concerning printing, displaying the set of initial values, and changing values of the parameters; and
a result image generator for generating a result image showing results of a statistical process performed on a plurality of differential data between a set of finalized values of the parameters, which are set a plurality of times in the past through the user interface, and the set of initial values of the data template; and
the result image that is generated by the result image generator is displayed simultaneously with the set of initial values, which are displayed by newly calling up the data template through the user interface.

9. A print production method using a system including an order-receiving server for managing ordering information for a print, and a printing management server for managing a print job for producing the print, wherein:
the order-receiving server includes a computing unit configured to carry out a transmitting step of transmitting an electronic operation manual including the ordering information to the printing management server; and
the printing management server includes a computing unit configured to carry out:
a classifying step of classifying a plurality of items for identifying content of the print job to be carried out into specifiable items that can be specified uniquely according to the transmitted electronic operation manual, and unspecifiable items that cannot be specified uniquely according to the electronic operation manual;
a generating step of generating job information descriptive of the print job by determining content of one or more unspecifiable items classified according to guidelines; and
a storing step of storing the generated job information in association with a management identifier of the print job,
wherein the printing management server further carries out:
a reference storing step of storing template information or additional information concerning the unspecifiable items in a reference database; and
wherein the generating job information comprises generating the job information by determining content of the unspecifiable items, on the basis of results of a search of the reference database, which is carried out under search conditions represented by a portion of the information included in the electronic operation manual.

10. A non-transitory storage medium in which a print production program is stored to be executed by a system including an order-receiving server for managing ordering information for a print, and a printing management server for managing a print job for producing the print, wherein:
the print production program enables the order-receiving server, which includes a computing unit, to carry out a transmitting step of transmitting an electronic operation manual including the ordering information to the printing management server; and
the print production program enables the printing management server, which includes a computing unit, to carry out:
a classifying step of classifying a plurality of items for identifying content of the print job to be carried out into specifiable items that can be specified uniquely according to the transmitted electronic operation manual, and unspecifiable items that cannot be specified uniquely according to the electronic operation manual;

a generating step of generating job information descriptive of the print job by determining content of one or more unspecifiable items classified according to guidelines; and a storing step of storing the generated job information in association with a management identifier of the print job, and the print production program further enables the printing management server to further carry out:

a reference storing step of storing template information or additional information concerning the unspecifiable items in a reference database; and wherein the generating job information comprises generating the job information by determining content of the unspecifiable items, on the basis of results of a search of the reference database, which is carried out under search conditions represented by a portion of the information included in the electronic operation manual.

11. A printing management server for managing a print job for producing a print, comprising:

an item classifier which includes a computing unit configured to classify a plurality of items for identifying content of the print job to be carried out into specifiable items that can be specified uniquely according to the received electronic operation manual, and unspecifiable items that cannot be specified uniquely according to the electronic operation manual;

a job information generator which includes a computing unit configured to generate job information descriptive of the print job by determining content of one or more unspecifiable items classified by the item classifier according to guidelines; and a job information database for storing the job information that is generated by the job information generator in association with a management identifier of the print job, a reference database for storing template information or additional information concerning the unspecifiable items; and wherein the job information generator generates the job information by determining content of the unspecifiable items, on the basis of results of a search of the reference database, which is carried out under search conditions represented by a portion of the information included in the electronic operation manual.

12. The printing management server according to claim 11, further comprising:

an identifier generator for generating a common identifier, which is identical to or different from the management identifier, in the event that the job information is newly generated by the job information generator;

wherein the job information database stores at least one of the job information and the management identifier in association with the common identifier that is generated by the identifier generator.

13. The printing management server according to claim 11, further comprising:

a reference database for storing template information or additional information concerning the unspecifiable items;

wherein the job information generator generates the job information by determining content of the unspecifiable items, on the basis of results of a search of the reference database, which is carried out under search conditions represented by a portion of the information included in the electronic operation manual.

14. The printing management server according to claim 11, further comprising:

a guideline updater for updating the guide lines; and the job information generator generates the job information according to the guidelines that are updated by the guideline updater.

15. The printing management server according to claim 14, wherein the guideline updater updates the guidelines by extracting new guidelines that differ from original guidelines on the basis of differential information between original job information generated according to the original guidelines and new job information produced by changing the content of the original job information.

16. The printing management server according to claim 15, wherein the guideline updater updates the guidelines if the guideline updater receives an action taken by a user of the printing management server.

17. The printing management server according to claim 11, further comprising:

a protocol converter for converting a data format of the electronic operation manual, according to a data protocol for normalizing data formats of a plurality of types of electronic operation manuals.

* * * * *